L. T. LARSON.
BIRD HOUSE.
APPLICATION FILED SEPT. 25, 1916.
1,209,979.
Patented Dec. 26, 1916.
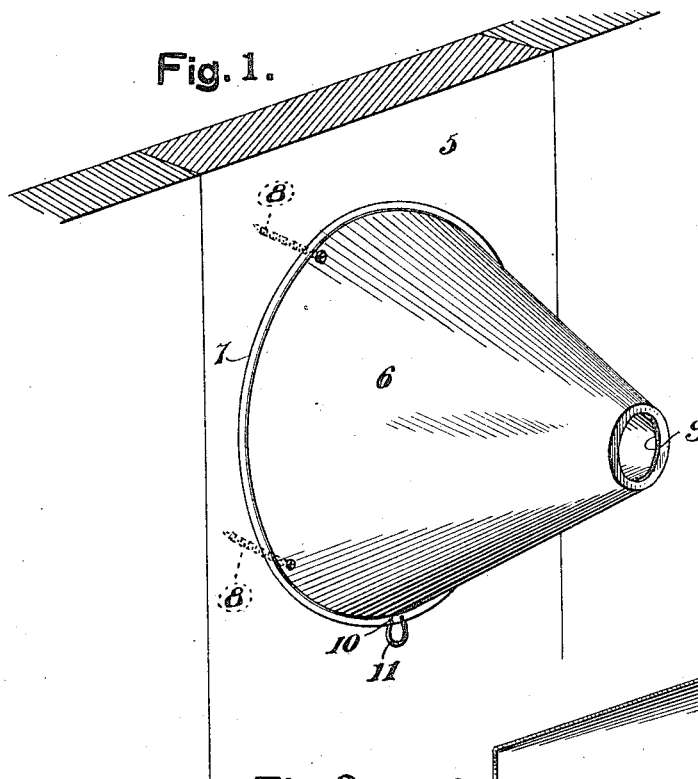
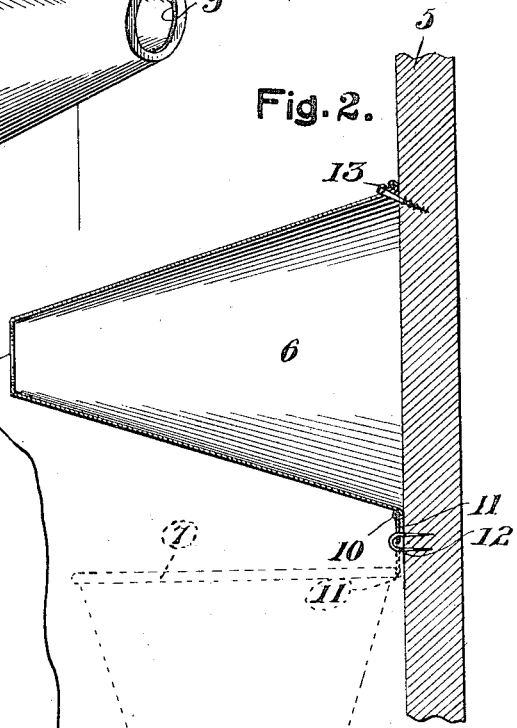
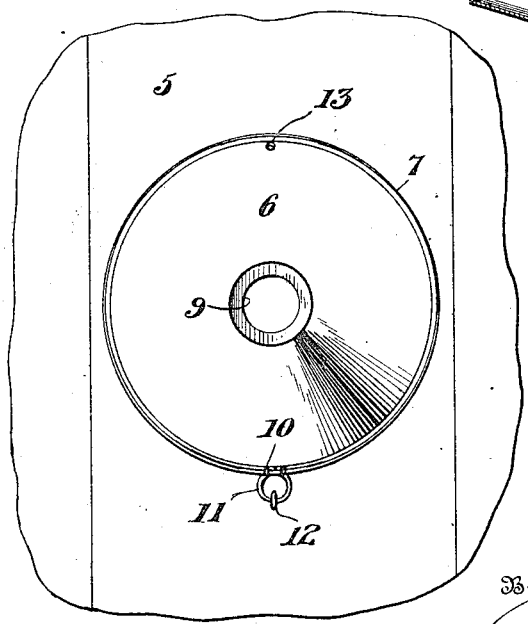
Inventor
L. T. Larson
By Jakobson & Wilson
Attorneys

UNITED STATES PATENT OFFICE.

LOUIS T. LARSON, OF STANTON, IOWA.

BIRD-HOUSE.

1,209,979.          Specification of Letters Patent.      Patented Dec. 26, 1916.

Application filed September 25, 1916. Serial No. 121,979.

*To all whom it may concern:*

Be it known that I, LOUIS T. LARSON, a citizen of the United States, residing at Stanton, in the county of Montgomery and State of Iowa, have invented certain new and useful Improvements in Bird-Houses, of which the following is a specification.

This invention relates to certain new and useful improvements in bird houses.

An object of the invention is to provide an improved form of bird house especially adapted and designed for the housing of the smaller species of birds, preferably wrens, the house being of such form, construction and proportions as to safely guard the wren from larger pestiferous birds.

A further object of the invention is to provide an improved form of bird house for wrens in which the house is in the form of a truncated cone or pyramid with the longitudinal axis of the casing or house horizontally positioned with the larger end thereof positioned adjacent a support while the smaller end constitutes the entrance thereto.

A still further object of the invention is to provide an improved form of bird house with open ends, one of the openings being larger than the other, with the smaller one constituting the entrance to the house.

A still further object of the invention is to provide an improved form of bird house with open ends and in which the house is hinged to a support so that the same may be swung to the desired position for purposes of cleaning the same.

With the above and other objects in view as will appear as the nature of the invention is better understood, the same consists of the novel construction, combination and arrangement of parts hereinafter more fully described, illustrated in the accompanying drawings, and then claimed.

In the drawings forming a part of this application and in which like designating characters refer to corresponding parts throughout the several views:—Figure 1 is a perspective view of a bird house constructed in accordance with the present invention, a support therefor being partially shown. Fig. 2 is a vertical longitudinal sectional view of a modified form of construction of the device, and, Fig. 3 is a front elevational view of the form shown in Fig. 2.

The present invention aims to provide an improved form of bird house especially designed for wrens so that the birds may be safely housed therein without danger of being attacked by larger birds. The form of bird house shown has been found to be entirely practical after repeated tests and numerous ones are now in operation.

The form of bird house is extremely simple in construction and the preferred form includes but a single element, and that is a truncated cone with the larger end thereof secured to a support, as a barn, a house, a fence or any other convenient support.

The modified form of the invention contemplates the idea of hinging the bird house to a support so that the same may be moved to a position as shown by dotted lines in the accompanying drawing for purposes of cleaning the same.

Referring more in detail to the accompanying drawing, the reference numeral 5 designates a support of any suitable character while the reference numeral 6 designates the bird house in the form of a truncated cone or pyramid. The larger end of the house 6 is provided with a rolled or beaded edge 7 and arranged at suitable intervals about the bead 7 are a series of openings through which fastening members such as screws 8 are adapted to extend to be received in the support 5 whereby the bird house is retained in position. This manner of securing the bird house in position is the preferred form of construction, but it is to be understood that various means may be employed which will fall within the scope of the present invention. The smaller end of the house 6 has an inwardly-directed flange 9 formed integral therewith so as to reduce the size of the opening, and also to prevent the material constituting the bird's nest from falling out. The size of this opening is of such proportions as only to permit the entrance of a bird the size of a wren so that birds of larger species are prevented from entering the house and doing injury to the nests and young birds.

The device may be mounted to any suitable support as desired and readily removed therefrom by extracting the fastening screws 8 for purposes of cleaning the house or displacing the same.

In the modified form of the invention shown in Fig. 2, the essential details of the device are present therein with the addition of a hinge element whereby the house may be hingedly connected to its support. The bead 7 of the house 6, as shown in Figs. 2 and 3 has the portion 10 thereof constituting one of the elements of a hinge, the other element being in the form of a ring indicated at 11 and secured to the support 5 by the staple 12. A single screw is preferably employed with this form of the device, and is diagonally disposed as indicated at 13, the screw passing through the house 6 and into the support 5. When it is desired to clean the bird house, the same may be lowered by removing the screw 13 from the support 5 which will permit the house to drop to the dotted line position shown in Fig. 2 and at which time the contents of the bird house may be removed by either elevating the same from the house or forcing the contents thereof through the opening in the reduced end.

From this detailed description of the invention including both forms, it is thought that the construction and operation thereof will be readily apparent and while the forms of the invention herein shown and described are what are believed to be the preferred embodiments thereof, it is nevertheless to be understood that various forms, modifications and arrangements of the parts may be made without departing from the spirit and scope of the invention as claimed.

What I claim as new is:—

In combination with a support, a bird house comprising a casing of frusto-conical form, an annular bead formed at the larger end thereof, a hinge connection between the beaded end of the casing and the support, and means carried by the casing for engaging said support for retaining the casing in operative position.

In testimony whereof I affix my signature.

LOUIS T. LARSON.

Copies of this patent may be obtained for five cents each, by addressing the "Commissioner of Patents, Washington, D. C."